United States Patent Office 3,701,669
Patented Oct. 31, 1972

3,701,669
EDIBLE FOAM-PRODUCT
Wilhelm Elbertus van der Hoven, The Hague, Netherlands, assignor to Lenderink & Co. N.V., Schiedam, Netherlands
Filed May 20, 1969, Ser. No. 826,210
Claims priority, application Great Britain, May 23, 1968, 24,733/68
Int. Cl. A23g 3/00
U.S. Cl. 99—139
6 Claims

ABSTRACT OF THE DISCLOSURE

An edible foam product is prepared by preparing a mixture containing foamable protein, liquid fatty material, and an edible binder on the basis of guar and/or carregenate of potassium and/or sodium and/or calcium carregenate, and foaming the mixture thus obtained.

---

Figure 1:
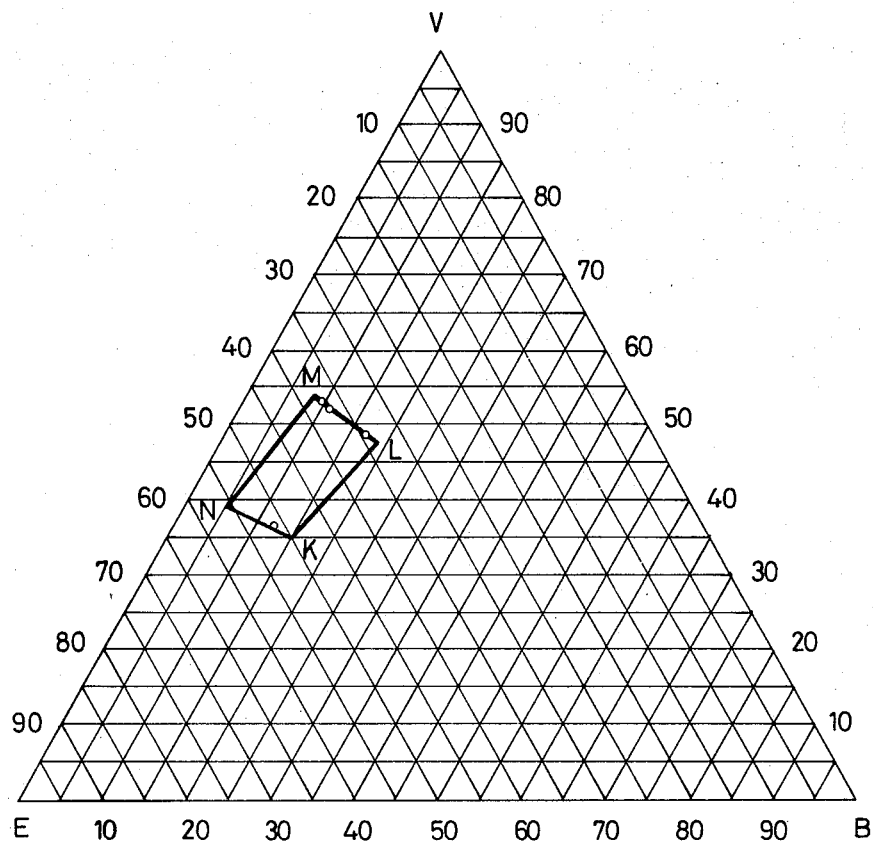

This invention relates to a method of making an edible foam product containing a fatty material, which comprises preparing an aqueous, liquid mixture containing foamable protein and fatty material, and foaming such mixture in any known manner.

It is well-known that a liquid containing foamable protein and fatty material, for example, milk, cannot just be beaten into a foam.

In Dutch patent specification No. 111,074, there is proposed a method in which a foam is prepared by beating-up a liquid comprising water, foamable protein and fatty material, to which is added a mixture of emulsifiers selected from two different groups. One of these groups comprises cephalin, lecithin and cetyl alcohol, and the other comprises esters of higher fatty acids with polyhydric alcohols, in which one or more hydroxyl groups have remained unesterified.

In this prior method the preferred procedure is to melt a fat in the presence of the selected mixture of emulsifiers, whereafter a dispersion in water of a protein, for example, milk albumen produced by dialysis, is added. Before being beaten into a foam, the liquid is preferably homogenised and/or matured under refrigerating conditions for 10 or more hours.

One disadvantage of using the above emulsifiers belonging to the group of higher fatty acid esters is that owing to their high melting point they stick to the palate and tongue during consumption, which is experienced as a disagreeable taste.

According to the invention, there is provided a method of the kind described, which is characterized in that a mixture is prepared which in addition contains an edible binder on a guar basis and/or carregenate of potassium and/or sodium and/or calcium carregenate, and the mixture is foamed while the fatty material is in the liquid state.

Within the scope of the present invention, the term "fatty material" is used to describe the fatty edible fats and oils comprising the triglycerides of lipophilic fatty acids, such as butyric acid, palmitic acid, stearic acid, oleic acid, etc. They may be of synthetic or natural origin, solid or liquid, and be used by themselves or as mixtures. If a solid fat is used, it is necessary for the solid fat to be brought into the liquid form before foaming, since otherwise no foam can be produced.

The order of adding the components for preparing the liquid mixture is little critical. Thus it is possible first to prepare a powdered mixture from foamable protein, binder and a fat and then to add a liquid, which may or may not contain a fatty material. It is also possible first to prepare a powdered mixture which only contains a foamable protein and binder, and then to add, for example, milk, which—as is well-known—contains milk fat, provided it is ensured that as the liquid mixture is foamed, the fatty material component is liquid. Preferably the binder and the liquid are not mixed first, on account of the swelling of the binder which then occurs.

The foaming process can be carried out in any known manner, for example by hand by beating up, or mechanically, for example, by means of a so-called Hobart beater.

If a fat is used which at ambient temperature is solid, it is not necessary for the fat to be rendered liquid immediately before the mixture is foamed. Thus the mixture may first be prepared at ambient temperature and then heated to a temperature above the solidifying point of the fat, or, for example when using milk as the mixing liquid, one may first boil the milk, or at least warm it up to a temperature above the solidifying point of milk fat, and then prepare the mixture. It is not necessary to carry out the foaming process at a temperature above the solidifying point of the fat if, as is the case with milk, after the fat has been molten by heating, it remains liquid at temperatures below the solidifying point for a longer period of time, for example, due to super-cooling. It does appear that, generally speaking, a better end product is obtained when the foaming process is carried out at elevated temperatures, particularly at a temperature above the solidification point of the fat.

The weight ratio of foamable protein/binder/mixing liquid, or better the weight ratio protein/binder/fatty material has been found to be of great importance for the quality of the ready foam product. The quality of an edible foam product can be characterized by its specific gravity, a product or practical utility having a specific gravity of about 0.1–0.5. A foam having a specific gravity below about 0.1 is unstable and resembles lather, and a foam having a specific gravity above about 0.5 is flabby and has a poor dimensional stability.

Preferably, the mixture prepared for foaming has a weight ratio of protein/binder/fatty material within the range KLMN in FIG. 1.

Figure 2:
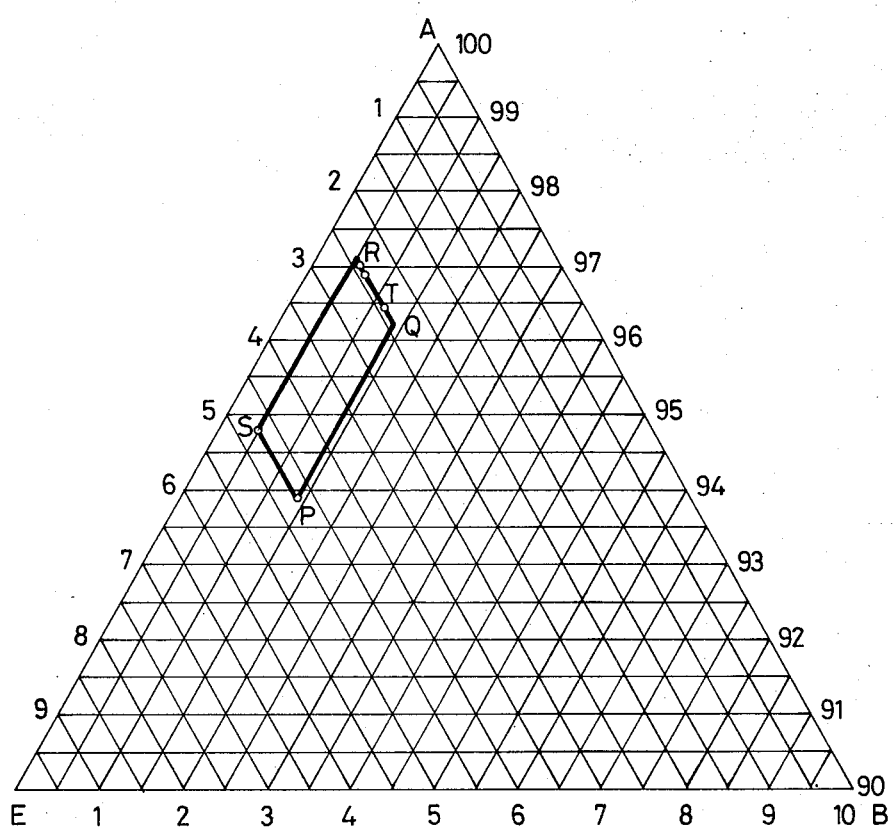

The range KLMN results from experiments, using milk having a fat content of 3.5% by weight as the mixing liquid, a specific gravity of 0.1–0.5 being used as the criterion for a foam product of good quality (Example III, Table C). If the test results are plotted as the result of a three-components system, protein/binder/mixing liquid, the result is the range PQRS of FIG. 2.

In the specification, the symbols E, B, V and A are to denote protein, binder, fatty material, and mixing liquid, respectively.

By varying the weight ratio of the three components within the range KLMN in FIG. 1, the properties such as lightness, firmness, specific gravity, etc. can be varied as desired.

It should be understood, however, that the invention is not limited to the range KLMN in FIG. 1. As shown by Example V Table E, a good product can be obtained using weight ratios outside this range.

The protein used in the method according to the invention may be a dry powdered protein of vegetable or animal origin, for example the commercially available Hyfoama 66, which is a partly hydrolyzed gluten protein. Powdered hen egg albumen is also suitable.

Examples of suitable binders on the basis of guar are Guarter, Guar CSAA-M 200, Meypro LK 10, etc.

The carregenate used according to the invention may be a potassium sodium carregenate or a calcium carregenate, for example, Satiagum B and Satiagel HV, respectively, marketed by Société de Produite Chimiques d'Auby. It is also possible to use a mixture of binders.

The mixing liquid used in the method according to the invention may be milk. However, water containing a fatty material may also be used.

According to the invention, there is further provided a so-called instant composition or mix for preparing an edible foam product, comprising a foamable protein, an edible binder on the basis of guar and/or carregenate of potassium and/or sodium and/or calicum carregenate and optionally a fatty material.

One possibility of using the foam product according to the invention, for example, is to stir it into a pudding to make the latter light and frothy. The foam product may also be used in or on pastries, tarts, cakes, etc.

If so desired sugar, flavouring material etc., may be incorporated into the powdered mix of protein and binder.

The binders according to the invention are tasteless.

The invention is illustrated in and by the following examples.

EXAMPLE I

In a series of experiments, the foaming result was determined with various compositions of the liquid to be foamed, the mixing liquid used being unboiled milk.

The liquid to be foamed was made by stirring a previously prepared powdered mixture of protein, possibly a binder, and sugar with milk.

The liquid was beaten up in a Hobart adjustable speed beater, and in all experiments there was used a speed corresponding to position 3 of the machine. The result was evaluated after beating for 5 minutes, whereafter the specific gravity of the foam was determined.

A low specific gravity (of about 0.10 or less) indicates an unstable foam; a high specific gravity (of about 0.50 or more) indicates a foam of insufficient firmness.

The results are shown in Table A. It will be seen that the liquid could not be beaten into a foam in any of the cases.

TABLE A

[Foaming result using unboiled whole milk as mixing liquid; temperature of liquid to be foamed 20° C.]

| Components | Composition in grammes | | | | |
|---|---|---|---|---|---|
| Hyfoama albumen | 10 | 10 | 15 | 15 | |
| Satiagel binder | | 2½ | | | 1 |
| Sugar | | 100 | 100 | | 100 |
| Milk | 200 | 200 | 200 | 200 | 200 |
| Specific gravity after beating for 5 minutes | (1) | (1) | (1) | (1) | (1) |

[1] No foam.

EXAMPLE II

The liquid to be foamed was prepared in the manner described in Example I, but using cold previously boiled milk as the mixing liquid.

The results are shown in Table B. It will be seen that even without a binder a foam can be produced but of a quality which is unsuitable for practical purposes.

When a small quantity of binder was incorporated into the liquid to be foamed, the quality of the foam product was markedly improved, which could also be concluded from the specific gravity.

In the light of the experiments described in Example I, the experiments of Example II show that the heating of the milk as the mixing liquid is evidently of decisive importance for the foam formation. When the tests were repeated, using boiled milk stored in a refrigerator for 3 days, no foam was produced.

TABLE B

[Foaming result using boiled whole milk as the mixing liquid; temperature of the liquid to be foamed 20° C.]

| Components | Composition in grammes | |
|---|---|---|
| Hyfoama albumen | 15 | 15 |
| Satiagel binder | | 1 |
| Sugar | 100 | 100 |
| Milk | 200 | 200 |
| Specific gravity beating for 5 minutes | 0.55 | 0.43 |

EXAMPLE III

A series of experiments was conducted to investigate the effect of the weight ratio protein/binder/mixing liquid on the foaming result.

The powdered mixture, prepared in accordance with the previous examples, was stirred with boiling milk that is to say milk used immediately after being brought to the boil.

The results are summarized in Table C. Foam products having a specific gravity less than about 0.10 and higher than about 0.50 are unsuitable.

TABLE C

| Components | Percent by weight E/B/A | Percent by weight E/B/V | Weight in grams | Percent by weight E/P/A | Percent by weight E/B/V | Weight in grams | Percent by weight E/B/A | Percent by weight E/B/V | Weight in grams | Percent by weight E/B/A | Percent by weight E/B/V | Weight in grams | Percent by weight E/B/A | Percent by weight E/B/V | Weight in grams |
|---|---|---|---|---|---|---|---|---|---|---|---|---|---|---|---|
| Hyfoama (albumen) | 2.4 | 34.5 | 7.5 | 3.6 | 51.3 | 10 | 4.7 | 51.3 | 10 | 4.8 | 69 | 10 | 4.7 | 59 | 5 |
| Satiagel (binder) | 1.2 | 17.2 | | | | 2.5 | 1.2 | 12.6 | | 0 | | 3 | 1.4 | | 1 |
| Sugar | | | 100 | | | 100 | | | 100 | | | 100 | | | 100 |
| Milk: | | | | | | | | | | | | | | | |
| Skimmed | | | 133 | | | 193 | | | 193 | | | 193 | | | 193 |
| Milkfat | 96.4 | 46.3 | 7 | 96.4 | 48.3 | 7 | 94.1 | 36.9 | 7 | 95.2 | 41 | 7 | 93.9 | 36.9 | 7 |
| Specific gravity after beating for 5 minutes | (¹) | 0.17 | | | | | | | | 0.22 | | | 0.22 | | |

| Components | Composition at— | | | | | | | | | | | | | | |
|---|---|---|---|---|---|---|---|---|---|---|---|---|---|---|---|
| | Percent by weight E/B/A | Percent by weight E/B/V | Weight in grams | Percent by weight E/B/A | Percent by weight E/B/V | Weight in grams | Percent by weight E/B/A | Percent by weight E/B/V | Weight in grams | Percent by weight E/B/A | Percent by weight E/B/V | Weight in grams | Percent by weight E/B/A | Percent by weight E/B/V | Weight in grams |
| Hyfoama (albumen) | 2.4 | 38.4 | 5 | 2.4 | 55.5 | 1.25 | 10 | 4.8 | 37.8 | 10 | 57.2 | 1.5 | 15 | 2.4 | 37.0 | 5 |
| Satiagel (binder) | 0.5 | 7.7 | | 0.5 | 5.6 | | 0.5 | 0.2 | 9.4 | 0.5 | 2.8 | | 0.7 | 11.1 | 2.5 |
| Sugar | | | 100 | 100 | | | 100 | | | 100 | | | | | | 100 |
| Milk: | | | | | | | | | | | | | | | | |
| Skimmed | | | 193 | | | 193 | | | 193 | | | 193 | | | 193 |
| Milkfat | 97.1 | 53.9 | 7 | 97.0 | 39.9 | 7 | 95.0 | 52.8 | 7 | 40.0 | | 7 | 96.9 | 51.9 | 7 |
| Specific gravity after beating for 5 minutes | 0.40 | | | | | | | | | 0.09 | | | 0.27 | | |

| Components | Percent by weight E/B/A | Percent by weight E/B/V | Weight in grams |
|---|---|---|---|
| Hyfoama (albumen) | 2.4 | 60.2 | 15 |
| Satiagel (binder) | 0.7 | 0 | 0.5 |
| Sugar | | | 100 |
| Milk: | | | |
| Skimmed | | | 193 |
| Milkfat | 93.0 | 31.6 | 7 |
| Specific gravity after beating for 5 minutes | 0.08 | | |

See footnote at end of table.

TABLE C—Continued

| Components | Composition at— | | | | | | | | | | | | | | | | | | | | | |
|---|---|---|---|---|---|---|---|---|---|---|---|---|---|---|---|---|---|---|---|---|---|---|
| | Percent by weight | | Weight in grams | Percent by weight | | Weight in grams | Percent by weight | | Weight in grams | Percent by weight | | Weight in grams | Percent by weight | | Weight in grams | Percent by weight | | Weight in grams | Percent by weight | | Weight in grams | Percent by weight | |
| | E/B/A[1] | E/B/V[2] | | E/B/A | E/B/V | | E/B/A | E/B/V | | E/B/A | E/B/V | | E/B/A | E/B/V | | E/B/A | E/B/V | | E/B/A | E/B/V | | E/B/A | E/B/V |
| Hyfoama (albumen) | 7.0 | 4.8 | 10 | 3.2 | 48.6 | 15 | 4.7 | 58.7 | 10 | 4.8 | 58.8 | 10 | 4.8 | 58.8 | 10 | 4.8 | 58.8 | 10 | 4.8 | 58.8 | 10 | 4.8 | 58.8 |
| Satiagel (binder) | 0.2 | 2.2 | ... | 3.0 | ... | ... | 0.5 | ... | ... | 0.5 | ... | ... | 0.5 | ... | ... | 0.5 | ... | ... | 0 | ... | ... | 0 | ... |
| Sugar | ... | ... | 100 | ... | ... | 100 | ... | ... | 100 | ... | ... | 100 | ... | ... | 100 | ... | ... | 100 | ... | ... | 100 | ... | ... |
| Milk: | | | | | | | | | | | | | | | | | | | | | | | |
| Skimmed | 92.8 | 95.2 | 289 | 96.8 | 51.2 | 289 | 94.8 | 41.3 | 193 | 95.2 | 41.2 | 193 | 95.2 | 41.2 | 193 | 95.2 | 41.2 | 193 | 95.2 | 41.2 | 193 | 95.2 | 41.2 |
| Milkfat | | | 10.5 | | | 10.5 | | | 7 | | | 7 | | | 7 | | | 7 | | | 7 | | |
| Specific gravity after beating for 5 minutes | 0.08 | (³) | | 0.08 | | | 0.33 | | | 0.45 | | | 0.10 | | | 0.06 | | | 0.05 | | | | |

[1] The percentage by weight: E/B/A has been calculated on the basis of protein plus binder plus mixing liquid=100.
[2] The percentage by weight: E/B/V has been calculated on the basis of protein plus binder plus fatty material=100.
[3] (a) No foam; (b) 0.10.
[4] (a) No foam.

EXAMPLE IV

The effect of the initial temperature of the liquid to be foamed on the foaming result was investigated using water containing palm-kernel fat as the mixing liquid. The solidifying point of the palm-kernel fat was about 29° C. The liquid was beaten in a vessel having a copper coil around its outer wall, through which water of a controlled temperature was pumped.

The results, summarized in Table D, show that the subject mixing liquid must also have been heated above the solidifying point of the fat.

These results, and those of Example II show that no foaming results unless the fatty material is in the liquid state. Controls using an edible oil all produced a foam.

TABLE D

Foaming results, as a fuction of the initial temperature of the liquid to be foamed, using as the mixing liquid containing palm-kernel fat.

Composition:

| | G. |
|---|---|
| Hyfoama-albumen | 10 |
| Satia-binder | 1 |
| Sugar | 100 |
| Water+Palm-kernel fat (190 g. water+10 g. fat) | 200 |

| | Initial temperature of the foamed liquid, °C. | | | | |
|---|---|---|---|---|---|
| | 20 | 30 | 40 | 50 | 60 |
| Specific gravity foam product after beating for 5 minutes | (¹) | 0.40 | 0.26 | 0.22 | 0.22 |
| Temperature after beating for 5 minutes | 20 | 27 | 32 | 38 | 47 |

¹ No foam.

EXAMPLE V

In the same way as in Example III, the effect of the weight ratio protein/binder/mixing liquid on the foaming result was determined in a series of experiments, using as the mixing liquid boiling water containing palm-kernel fat. The fat content was varied.

The test results are summarized in Table E.

TABLE E.—EFFECT OF THE WEIGHT RATIO PROTEIN/BINDER/MIXING LIQUID (FATTY MATERIAL) ON THE FOAM, FORMATION USING AS THE MIXING LIQUID BOILING WATER PLUS PALM-KERNEL FAT

| Components | Percent by weight E/B/V | Weight in grams | Percent by weight | | Weight in grams | Percent by weight | | Weight in grams | Percent by weight | | Weight in grams | Percent by weight | | Weight in grams | Percent by weight | | Weight in grams | Percent by weight | | Weight in grams | Percent by weight | |
|---|---|---|---|---|---|---|---|---|---|---|---|---|---|---|---|---|---|---|---|---|---|---|
| | | | E/B/A | E/B/V | | E/B/A | E/B/V | | E/B/A | E/B/V | | E/B/A | E/B/V | | E/B/A | E/B/V | | E/B/A | E/B/V | | E/B/A | E/B/V |
| Hyfoama 66 | 23.8 | 10 | 4.7 | 19.2 | 10 | 4.7 | 16.1 | 10 | 4.7 | 32.2 | 10 | 4.7 | 24.4 | 10 | 4.7 | 19.6 | 10 | 4.7 | 45.4 | 10 | 4.7 | 4.7 |
| Satiagel | 4.4 | 1 | 0.9 | 4.0 | 2 | 0.9 | 3.4 | 1 | 0.5 | 34.4 | 1 | 0.5 | 2.4 | 1 | 2.0 | 9.2 | 1 | 0.9 | | 2 | 0.9 | |
| Sugar | 100 | 100 | | | 100 | | | 100 | | | 100 | | | 100 | | | 100 | | | 100 | | |
| Boiling water | 190 | 190 | | | 140 | | | 180 | | | 150 | | | 190 | | | 160 | | | 170 | | |
| Palm-kernel fat ⎰200 g⎱ | 71.4 | 10 | 94.4 | 76.8 | 60 | 83.2 | 80.5 | 20 | 94.8 | 64.4 | 73.2 | 50 | 78.0 | 92.5 | 40 | 94.8 | 45.4 | 30 | 92.0 | | | |
| Specific gravity after beating for 5 minutes | 0.33 | | | 0.25 | | | 0.54 | | | 0.45 | | | 0.33 | | | 0.48 | | | 0.23 | | | 0.28 | |

[1] The percentage by weight E/B/A has been calculated on the basis of protein plus binder plus mixing liquid=100.
[2] The percentage by weight E/B/V has been calculated on the basis of protein plus binder plus fatty material=100.

EXAMPLE VI

On the basis of the following composition

| | G. |
|---|---|
| Hyfoama 66 | 5 |
| Binder | 2.5 |
| Sugar | 100 |
| Boiling whole milk | 200 | and beating for 5 minutes in the Hobart beater, the following commercial binders were investigated as to their suitability in the production of the foam product according to the present invention. In the following summary, a positive foaming result is indicated by the specific gravity of the foam formed.

Binders:

| | Foam formation |
|---|---|
| Carregenates— | |
| Satiagel HV | 0.33 |
| Satiagum B | 0.29 |
| Genulacta GP 100 | --- |
| Genuvisco J | --- |
| Genugel WG | --- |
| Gelatan C | --- |
| Visuron | --- |
| Alginates and derivatives— | |
| Kelcoloid | --- |
| Keltone | --- |
| Alginate I.C.S. | --- |
| Alginate L 122 | --- |
| Manucolester ES/KN | --- |
| Cellulose and derivatives— | |
| C.M.C. HZ 858 | --- |
| Edifas A | --- |
| Tylose | --- |
| Gums— | |
| Karaya gum | --- |
| Gum Arabic | --- |
| Tragacanth | --- |
| Guar and derivatives— | |
| Guartec | 0.29 |
| Guar CSAA M 200 | 0.28 |
| Guar CSAA M 175 | 0.48 |
| Solgum 3 Ho | 0.31 |
| Meypro LK 10 | 0.33 |
| Meypro 912 | 0.38 |
| Gelatine 230 Bloom | --- |
| Starch and derivatives— | |
| Tarwena | --- |
| Maizena | --- |
| Instantgel PA 5 | --- |
| Carob flour | --- |
| Agar-Agar | --- |

The results show that a large number of the common edible binders are unsuitable for use in the method according to the invention.

I claim:

1. The method of preparing an edible stabilized foam product containing a fatty material, which comprises preparing an aqueous, liquid mixture containing foamable protein, liquid fatty material, and an edible binder on the basis of guar, and foaming this mixture in the absence of an emulsifier wherein said mixture has a weight ratio of protein to binder to liquid fatty material as described by the range KLMN in FIG. 1 of the drawing.

2. The method of preparing an edible stabilized foam product containing a fatty material, which comprises preparing an aqueous, liquid mixture containing foamable protein, a liquid fatty material, and an edible binder containing at least one representative of the group consisting of potassium sodium carregenate, potassium carregenate and sodium carregenate and calcium carregenate and foaming the mixture in the absence of an emulsifier wherein said mixture has a weight ratio of protein to binder to liquid fatty material as described by the range KLMN in FIG. 1 of the drawing.

3. The method of preparing an edible stabilized foam product containing a fatty material, which comprises preparing an aqueous, liquid mixture containing foamable protein, liquid fatty material, and an edible binder on the basis of guar and at least one representative of the group consisting of potassium sodium carregenate, potassium carregenate, sodium carregenate, and calcium carregenate, and foaming the mixture in the absence of an emulsifier wherein said mixture has a weight ratio of protein to binder to liquid fatty material as described by the range KLMN in FIG. 1 of the drawing.

4. An edible food comprising a foam product of the composition of claim 1.

5. An edible food comprising a foam product of the composition of claim 2.

6. An edible food comprising a foam product of the composition of claim 3.

References Cited

UNITED STATES PATENTS

| 3,431,117 | 3/1969 | Lorant | 99—139 |
| 3,350,209 | 10/1967 | Rodgers | 99—139 |
| 3,407,076 | 10/1968 | Ganz | 99—139 |
| 3,433,651 | 3/1969 | Diamond | 99—136 |
| 3,514,298 | 5/1970 | Noznick et al. | 99—139 X |
| 3,280,102 | 10/1966 | Gordon et al. | 99—136 X |

RAYMOND N. JONES, Primary Examiner

J. M. HUNTER, Assistant Examiner